INVENTOR.
ROBERT CRAWFORD LINGLEY.
BY
ATTORNEY.

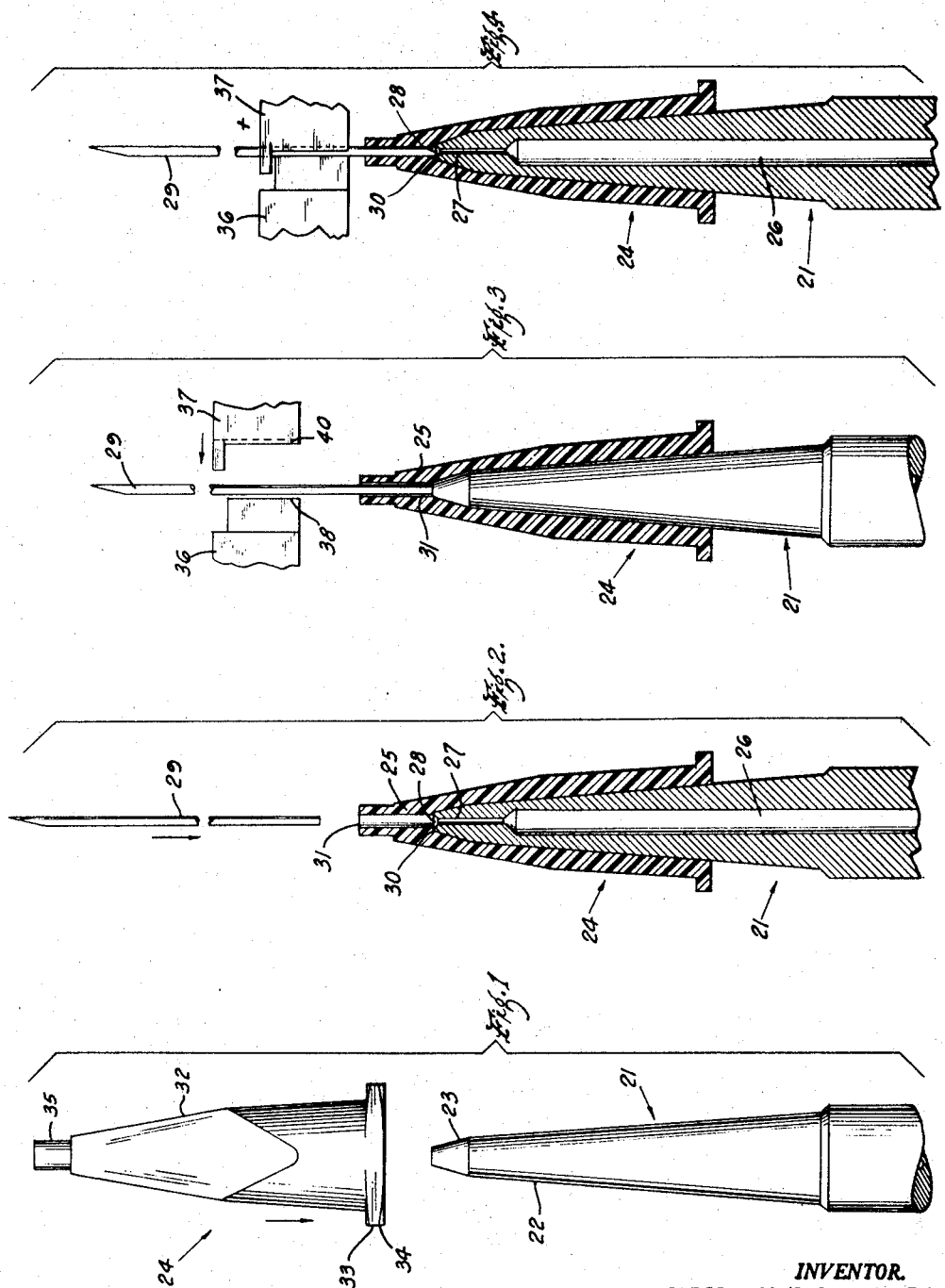

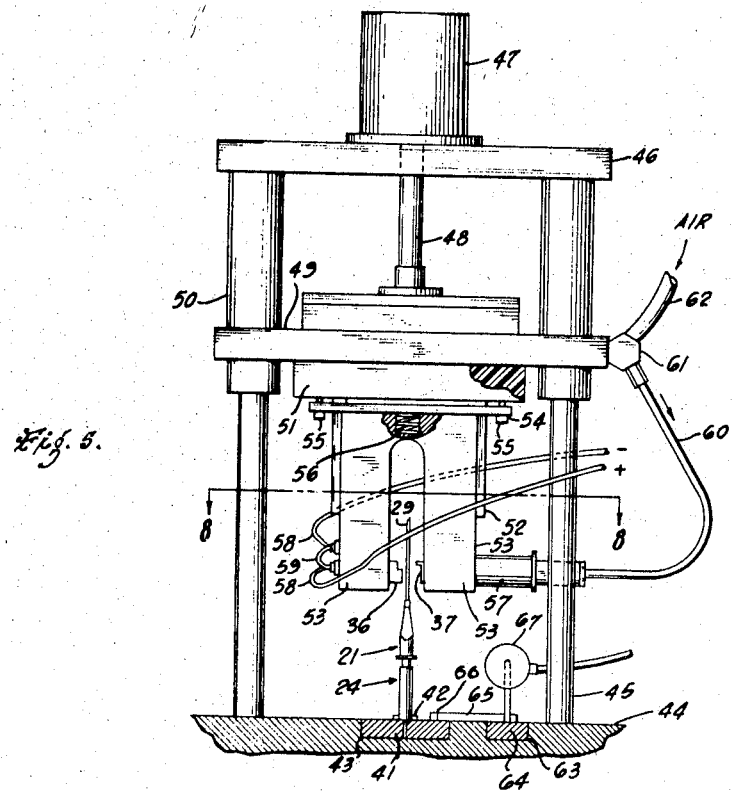
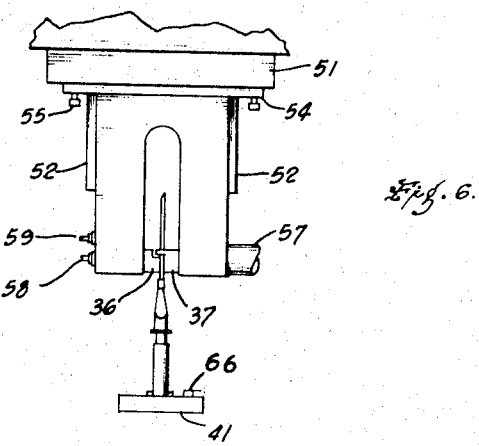

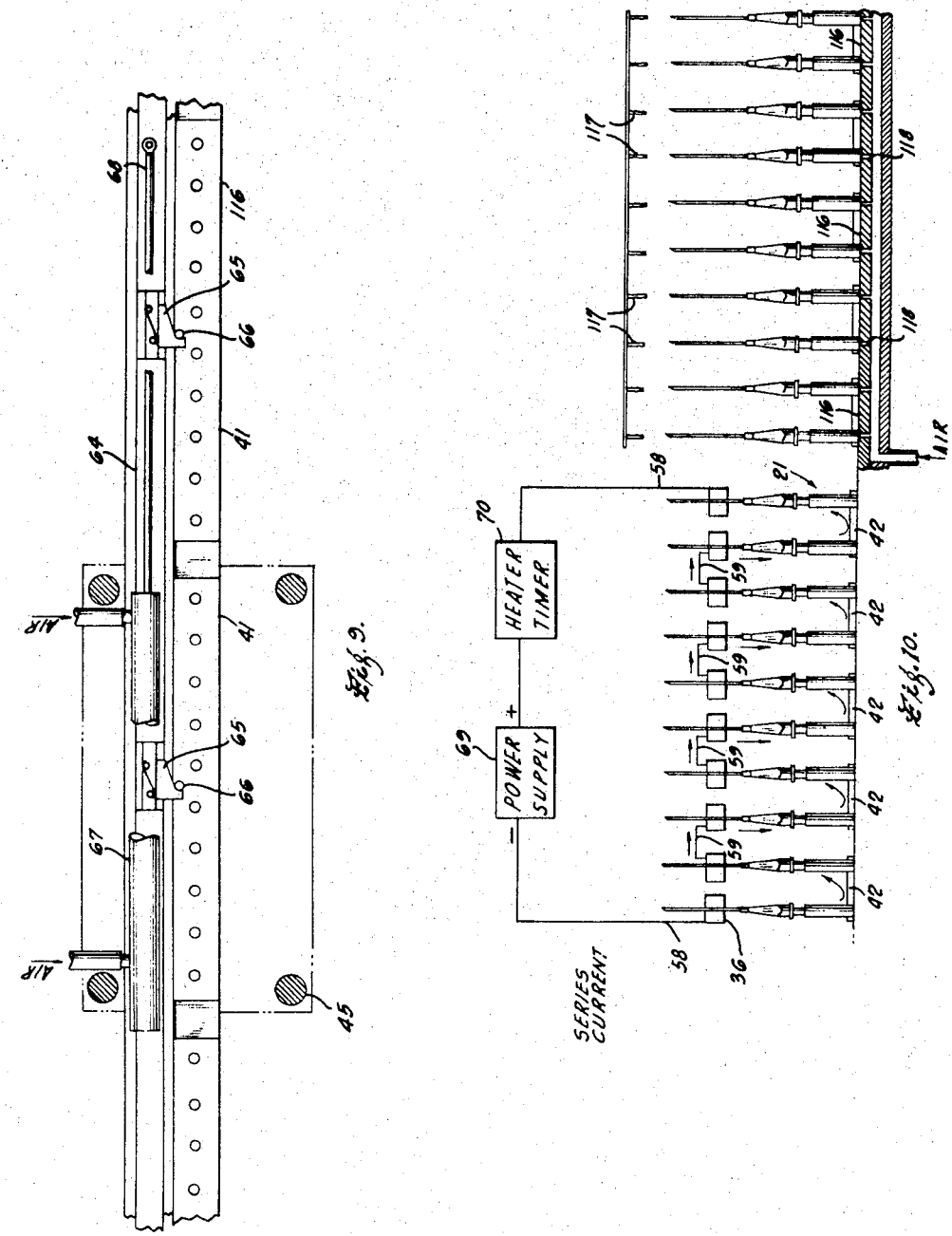

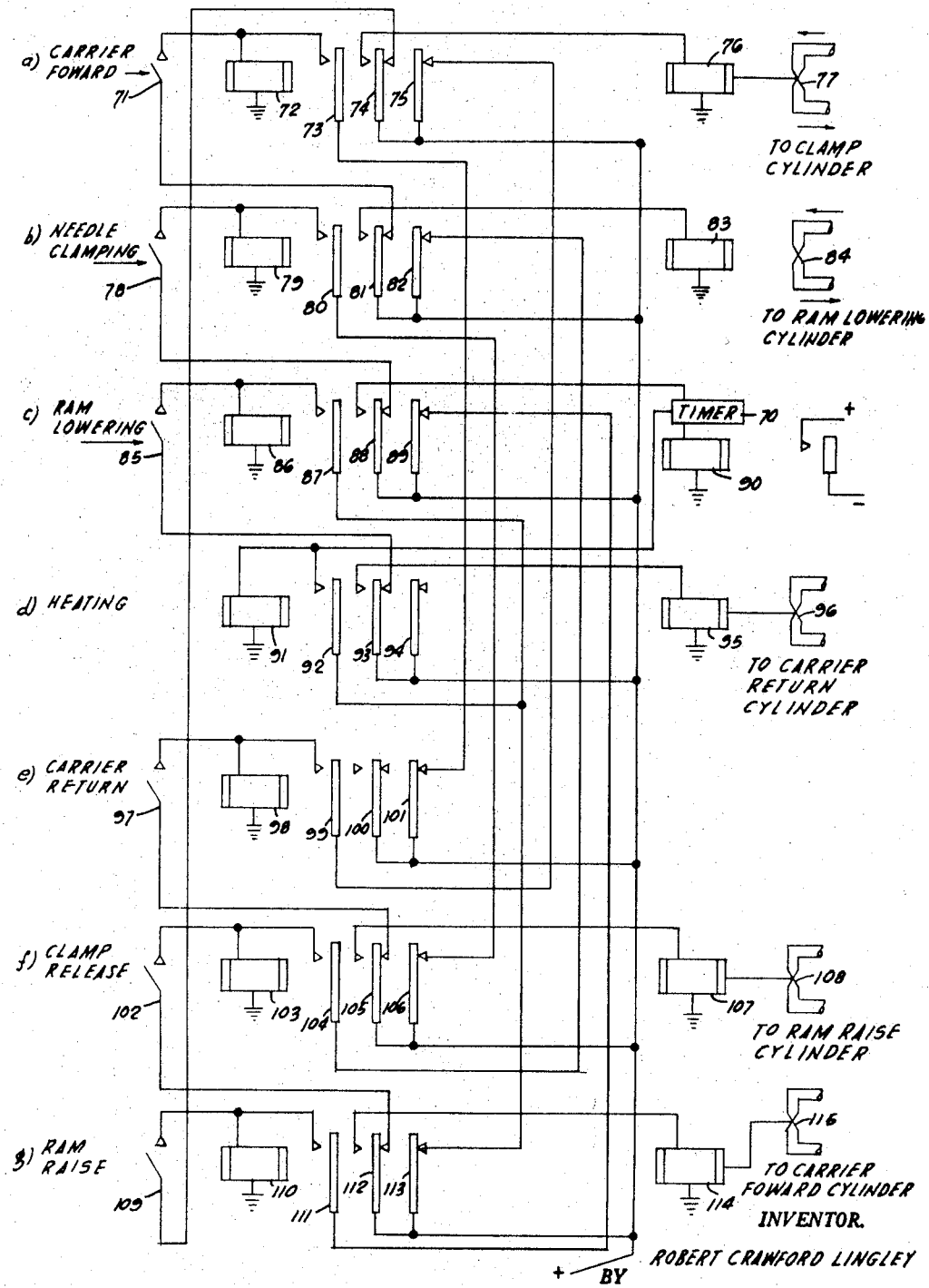

United States Patent Office 3,437,788
Patented Apr. 8, 1969

3,437,788
PROCESS FOR HYPODERMIC NEEDLES HAVING PLASTIC HUBS AND METAL CANNULAE
Robert Crawford Lingley, Dover, Mass., assignor to Baxter Laboratories, Inc., Morton Grove, Ill., a corporation of Delaware
Original application May 4, 1960, Ser. No. 26,893. Divided and this application Apr. 13, 1964, Ser. No. 364,351
Int. Cl. H05b 3/00; B29c 27/30; A61m 5/32
U.S. Cl. 219—162           3 Claims

ABSTRACT OF THE DISCLOSURE

A hub is secured to a cannula by setting hub plastic which has been heated to a flowable state by passing an electric current between a pair of cannulae connected electrodes one of which supports the hub.

---

This application is a division of application Ser. No. 26,893, filed May 4, 1960, now abandoned.

This invention relates to hypodermic needles having metal cannula and plastic hubs, designed primarily for single usage, and an apparatus and method for manufacture of such needles, and more particularly to hypodermic needles in which a plastic hub is heat shrunk against the metal cannula without the necessity for a separate adhesive. The hubs are preformed as is the cannula, and an electric current passing through the cannula between a needle-holding electrode and a pedestal electrode heats the cannula sufficiently that the adjacent plastic hub melts sufficiently to shrink against and adhere to the cannula.

For many years, hypodermic needles have been commonly formed from a hollow metallic cannula to which a metal hub is firmly attached, which hub is designed to connect to the tip on a hypodermic syringe. It has been customary for the user to clean and resterilize needles and reuse the same needle repeatedly. The cost of sterilizing is disproportionately high, and accordingly it becomes desirable to manufacture hypodermic needles which are to be used but once. The saving in time and labor costs on the part of the user is sufficient to more than compensate for the additional cost of needles. Additionally, inasmuch as the needle is to be used but once, each needle is factory-fresh and factory-sharp. The unpleasant aspects of dull hypodermic needles are well known to most patients.

Additionally, it has become apparent that hypodermic needles can transfer certain contaminants from patient to patient. Even though a hypodermic needle is treated by a sterilizing process which will inactivate bacterial contaminants, there are many viruses still remaining which can cause unpleasant complications to a subsequent patient. Inasmuch as such viruses are extremely hardy, they live under rather drastic sterilizing cycles, and can only be detected with the greatest of difficulty. A virus is only propagated in living tissue by definition, and such viruses may only grow in particular species. It is thus impractical to routinely test used hypodermic needles for freedom from viral contaminants. A thinner, sharper tip may be formed on a disposable needle inasmuch as the point does not have to be sufficiently sturdy to withstand rough treatment during sterilization.

In the past, the cannulae of hypodermic needles have at times been bent or specially shaped to permit them to be molded into plastic without the risk of becoming loose. Special cements or adhesives have been suggested for attaching the cannula to a plastic hub.

Inasmuch as all material used for the cannula, for the adhesive, and for the hub must be free from deleterious side effects, it can be seen that the introduction of a component presents a requirement for additional tests to assure that such additional component has no deleterious side effects. The testing of a new material for long-term side effects is a time consuming and expensive problem.

Many compositions which cause no difficulty orally, or in skin contact, present new problems when injected into tissues. It thus becomes desirable to use a minimum number of materials and to use materials which have been previously found acceptable for use in contact with drugs. The wide variety of drugs and materials used presents a problem in being certain that no such components affect, or are affected by, materials of needle construction.

The needle hub of the present invention can be used to fasten hypodermic needle cannula to single use hypodermic syringes, as well as conventional hypodermic syringes. Usually, separate hypodermic needles and separate syringes are preferred even if both are disposable because of the wide variety of length and size of needles and the variety of size of hypodermic syringes.

In the present invention, any of the conventional metallic cannula may be used, preferably a stainless steel cannula is used which is resistant to rust, resistant to medicaments, noncorrosive and strong. One such tubing is described in United States Patent No. 2,428,518, S. J. Everett, Hypodermic Tubing, Dental Broaches and the Like. Other tubing, of course, can be used. The magnetic susceptibilty of such steels is variable so induction heating may be of questionable uniformity. The ohmic resistance is generally comparatively uniform. The cannulae themselves may be made and the cannulae sharpened by conventional procedures.

The hubs are made from a plastic which is dimensionally stable, inert, odor free, and which is thermoplastic, with the characteristic of wetting the metal surface of the needle. The cellulose propionate type of plastic is particularly satisfactory. Other acyl cellulose, such as cellulose acetate and cellulose butyrate, may be used. A cellulose propionate such as sold under the trade name "Forticel" is particularly satisfactory because it is odor free, melts at a reasonable temperature, preferentially wets the metal of the cannula and has been approved for use in contact with drugs which are to be administered parenterally, and is available at a competitive price.

By my invention, the attachment of the hubs to the cannulae is conveniently accomplished by assembling preformed hubs and cannulae and passing an electric current, either alternate or direct, through the metal cannula until it becomes hot enough to melt the adjacent plastic of the hub while causing the plastic to melt, and shrink down against the cannula. The current is cut off, and the hub is permitted to cool until firm. It is convenient to connect several cannulae in series during the heating operation in order that a single higher voltage current is drawn with lower amperage requirements. Series wiring also gives a guarantee that the heating is uniform in all needles in the series as, if any electrical connection is defective, no current will flow and no seals will be formed.

Additional advantages and objects of the present invention appear in the following description of a specific embodiment which is shown in the accompanying drawings in which:

FIGURE 1 shows the positioning of a hypodermic needle hub on a pedestal electrode.

FIGURE 2 shows the insertion of hypodermic needle cannula in the hub on the pedestal.

FIGURE 3 shows the closing of the clamping jaw against the needle-holding electrode.

FIGURE 4 shows the clamping jaw in position against the needle-holding electrode, and the plastic hub shrunk against the needle after the completion of the heating cycle. The first four figures are enlarged for clarity.

FIGURE 5 is an end view in partial section of the needle-attaching machine with the ram up and the clamping jaws open.

FIGURE 6 is a view of part of the machine as in FIGURE 5, but with the clamping jaws closed and the ram down.

FIGURE 9 is a top view in smaller size showing the pallet in position and the carrier in the extended position.

FIGURE 10 is a diagrammatical view showing power supply and timer connected through the cannulae in series, and a testing station.

FIGURE 11 is a circuit diagram of the complete machine.

Figure 7:
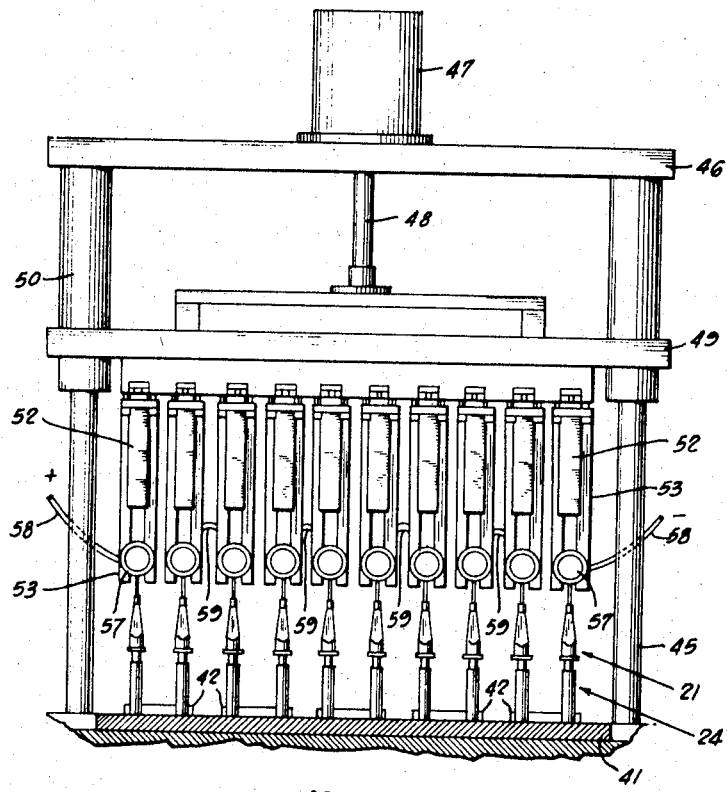
FIGURE 7 is a front view of the needle-attaching machine at the start of the cycle with the ram up and the clamps open.

An important feature of the present machine is a pedestal electrode 21 as shown in FIGURE 1, which electrode has a taper section 22 and a transition section 23. The taper section has a taper to match the hub of a hypodermic needle. Usually, a standard Luer taper is preferred as such taper matches standards adopted for wide usage. This taper section is at least long enough to receive the largest plastic hub 24 which is to be placed on the pedestal electrode. Above the taper section is the transition section 23 which has a sharper taper to correspond to the fairing in the internal hole in the hub between the taper section and the cannula-holding section 25. Through the pedestal electrode is a testing bore 26 at the upper end of which is a gas orifice 27, the upper end of which has a slight counterbore 28. This counterbore is just large enough to aid in centering a cannula 29. There is a small annular flat section 30 between the internal taper of the counterbore and the external taper of the transistion section 23. Preferably, the pedestal electrode is of copper or brass or other electrically conductive metal having both a low electrical resistance and a high thermal conductivity.

In use, the plastic hub 24 is placed upon the pedestal electrode and conforms to the pedestal electrode. The cannula-holding section of the hub extends above the top of the pedestal electrode and has a cannula receiving hole 31 which is slightly larger than the outside of the cannula 29. A difference in diameter of about 0.003 inch gives good results.

The plastic hubs preferably have a square section 32 which serves for convenience in holding the needle hub while it is being twisted. The lower end of the hub is a flange 33 with can engaging projections 34. These cam engaging projections are designed to lock onto the internal thread of a lock tip hypodermic syringe, as for instance described in United States Patent No. 2,076,121, F. S. Dickenson, Hypodermic Syringe Needle Hub. The size and shape of the hub and these flanges and projections should be such as to fit the hypodermic syringe with which the needle is to be used, and conveniently conform to the current standards of the industry for Luer lock hubs. Extending in part above the square section is a reinforcing section 35 which conveniently is cylindrical and smaller than the flat of the hub. This reinforcing section serves the dual purpose of giving greater length of attachment between the hub and the cannula for better gripping; and being sufficiently flexible that, if in use the cannula is bent, the reinforcing section in part flexes with the cannula to avoid a short section of high stress concentration such as occurs when a stiff metal hub is used, and which frequently results in the snapping of the cannula adjacent to the hub.

After the hubs are positioned on the pedestal electrode, the cannulae themselves, which have been preformed in accordance with conventional practices, are placed on the cannula receiving hole, oriented with respect to the hub if desired and the cannula is ready for heating. The counterbore aids in centering the needle, and accurate alignment at this point aids in preventing melted plastic from leaking between the cannula and the counterbore of the pedestal electrode. The testing bore and gas orifice may be used to meter gas pressure and gas flow in testing for a blocked cannula.

Figure 8:
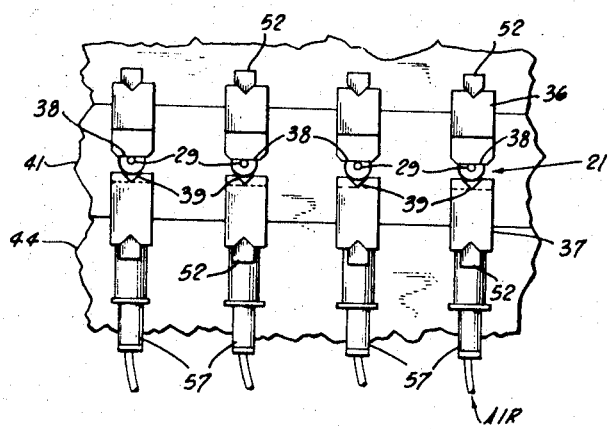
FIGURE 8 is a view along section 8—8 of FIGURE 5 showing the needle-holding electrodes in position and the clamping jaws open.

In use, a needle-holding electrode 36 is positioned above the pedestal electrode. The cannula is locked against the needle-holding electrode by a clamping jaw 37. As shown in FIGURE 8, the needle-holding electrode has a flat end 38 of such size that the cannula will rest against it even if slightly misaligned. The clamping jaw has an inverted V 39 which extends slightly above the flat end 38 of the needle-holding electrode so that as a clamping jaw is moved towards the electrode, the inverted V centers the cannula and locks the cannula between the clamping jaw and the needle-holding electrode. The main portion of the clamping jaw has a grooved end 40, which operates with the flat end 38 of the needle-holding electrode 36 to hold the cannula firmly and rigidly in position, and insure adequate electrical contact with the cannula.

The clamping jaw 37 and needle-holding electrode 36 with the cannula held between them are then moved downwardly towards the pedestal electrode. This guarantees that the cannula will be held downwardly against the pedestal electrode if, by chance, it was not completely inserted when being placed in the cannula hole. The grip between the clamping jaw and the needle-holding electrode is sufficient to allow them to slide along the cannula after the cannula is in position. In final position, the needle-holding electrode is just slightly above the end of the plastic hub. The needle-holding electrode at least should be of a metal which has low electrical resistance and high thermal conductivity.

An electric current is passed between the needle-holding electrode and the pedestal electrode through the cannula. The cannula is of a metal adapted for use as a hypodermic needle and may be a stainless steel cannula as described in United States Patent No. 2,428,518 mentioned above. Inasmuch as the cannula has a comparatively high electrical resistance, the current in passing through the cannula heats the cannula. Either a direct or alternating current can be used conveniently. A low voltage is easily controlled and gives good heating. The current is passed until the cannula becomes sufficiently hot to melt the plastic of the adjacent hub and cause the plastic to shrink against the cannula. A cellulose propionate hub shrinks against the cannula, wets the cannula, and uniformly adheres to the cannula giving a tight, firm hold. The entire plastic hub is not melted. Only enough of it is melted to fuse against the cannula. For ten hubs in series with twenty-five gauge needles, a current of about eight amperes for three to four seconds gives sufficient heating. A voltage of 4.8 gives this current. For ten eighteen-gauge needles, thirty amperes for twelve seconds requiring about nine volts gives a preferred heating cycle. A higher current for a shorter time or a lower current for a longer time can be used. The voltage varies to a considerable extent depending upon the resistance of the electrodes and the connectors. The metallic masses with the inherent large heat capacity of both the pedestal electrode and the needle-holding electrode keep the ends of the cannula comparatively cool and tend to concentrate the heat where it is desired between the two electrodes in the section of the cannula adjacent to the hub. This section of the cannula attains a temperature in the neighborhood of 350° F.

Although in no sense of the word the only machine for alignment of the needles, and the electrodes for the heating cycle, a convenient machine which will assemble ten needles to their hubs with each cycle is shown in FIGURES 5 through 11. Ten pedestal electrodes 21 are assembled with uniform spacing in a pallet 41 from which they are electrically insulated. Conveniently, the pallet may be of phenol-formaldehyde cloth filled resin having both high electrical resistance and dimensional stability, such as Bakelite. As shown in FIGURE 7, the pedestal electrodes are connected together in pairs with jumpers 42. The pallets with the pedestal electrodes thereon slide in a groove 43 in a base 44. Also mounted in the base are ram guides 45. As shown, on four ram guides above the base is mounted an upper frame 46 to which is secured a ram cylinder 47. This ram cylinder is an air-operated power cylinder. The ram cylinder piston rod 48 is mounted thereon and controls the position of a ram 49. Ram bushings 50 sliding on the ram guides 45 permit the ram to move smoothly up and down under the influence of air pressure in the ram cylinder. Mounted on the ram is an insulating block 51 of a dimensionally stable plastic such as Bakelite. Mounted on the insulating block 51 are ten pairs of V guideways 52. In these guideways slide ten needle-holding electrode supports 53. These supports have a support shoulder 54 through which shoulder positioning bolts 55 extend which are positioned to allow the blocks to slide a short distance from the insulating block 51. The supports are pressed away from the insulating block by compression springs 56. Thus, in use the needle-holding electrode supports are pressed downwardly from the insulating block, but are maintained in position parallel to the cannulae axes by the V guideways 52. A sliding distance of from $\frac{1}{16}$ to $\frac{1}{4}$ of an inch gives good results with twenty-five to eighteen gauge hypodermic needles.

Mounted in the lower end of these needle-holding electrode supports 53 are the needle-holding electrodes 36 above referred to. On the opposite side of each needle-holding electrode support is an air clamp cylinder 57. This is a cylinder, the piston of which is extended by air pressure and spring retracted, on the end of the piston rod of which is mounted the clamping jaw 37 above referred to. The needle-holding electrode supports are of an electrically conducting material. To the end electrode supports are connected heater cables 58 which extend to a suitable source of electrical power later referred to. Between each pair of electrode supports, which are opposite to an unconnected pair of pedestal electrodes, is a support jumper 59. These support jumpers are sufficiently flexible to permit any needle-holding electrode support to move the full distance permitted by the shoulder positioning bolts 55 without binding. Thus, an electrical current is conducted alternately up and down through the cannulae, forming with the support jumpers and the pedestal electrode jumpers a connected series, as is shown diagrammatically in FIGURE 10.

The compression springs 56 press each needleholding electrode support downwardly so that if uneven thermal expansion, or slipping of any grip occurs, the cannula is still pressed towards the pedestal electrode and the electrical circuit is not broken. Without such individual mounting, the expansion of one cannula could lift an adjacent cannula enough to break contact. With currents of from 2 to 20 amperes, and potentials of from 2 to 12 volts depending on needle size, the contacts must be good, and of low resistance.

The air clamp cylinders are fed through air lines 60 from a clamp manifold 61 which, in turn, is fed with operating air through a clamp air line 62 from a control valve later referred to.

In the base 44 is a slot 63 in which fits an indexing slide 64. As shown in FIGURES 5 and 9, on the indexing slide 64 are spring loaded indexing dogs 65 which pass on the return stroke, and on the forward stroke pick up the indexing pins 66 which are mounted on the pallets 41. The indexing slide is moved by the operating piston in a carrier cylinder 67 which is a double acting air-operated cylinder. The carrier piston rod 68 from this cylinder is connected to the indexing slide 64 and controls its motion and position.

As shown in FIGURE 10, a suitable power supply is connected through a heater timer 70 and the heater cables 58 in series through the needle-holding electrodes 36 to the pedestal electrodes 21 so that the ten needles are in series. The timing of the heater current is described later.

Either alternating or direct current can be used for the heating power. Conveniently, an alternating current from a variable voltage transformer operating from a stabilized potential source, such as a constant voltage transformer, is used. A variable resistance may be used to control current flow. A direct current is equally effective. An automobile storage battery, or a rectifier, or motor-generator set, gives good results. For purposes of clarity in the drawings, the current is illustrated as a direct current, with the positive and negative designation to indicate current directions and connections.

*Sequence of operations*

In the use of the present machine, the pallets are loaded by hand with the plastic hubs. The cannulae are then inserted in the hubs. A pallet containing a group of cannula-containing hubs on the pedestal electrodes in a pallet is treated as a unit.

The sequence of operations is:
(1) The carrier is moved forward;
(2) The needles are clamped;
(3) The ram is lowered;
(4) The heating current is turned on for the predetermined length of time necessary to melt the plastic against the needle cannulae, the heating is discontinued, and the needles assembled to the hubs are permitted to cool until the plastic has harened;
(5) During part of the cooling cycle, the carrier returns to pick up the next pallet;
(6) The needle clamps are released;
(7) The ram is raised; and
(8) Repeat.

Any convenient control system may be used, such as manual control of the various operations, or an interval timer to cause each operation to occur after a fixed interval, or a sequential system in which the completion of each operation actuates the initiation of the subsequent operation.

Without being limited thereto, one such sequential system is illustrated in FIGURE 11, in which a plurality of solenoid controlled air valves are used, and in which a plurality of three-pole double-throw switches are used. Some of the contacts are not used. The actuation of the various elements is controlled by positioning switches on the various operating elements. Inasmuch as such switches can be placed at various points of the machine, illustration on the main body of the machine would unduly complicate the drawings. The positioning switches are placed so as to be operated by the various moving members. Conventional single-pole single-throw, normally open microswitches may be used. These switches are shown only in FIGURE 11 where their functions are indicated.

The carrier forward positioning switch 71 is actuated by the carrier piston rod 68 completing a stroke in which the pallet 41 is moved forward to operating position. As the carrier forward positioning switch 71 is closed, the carrier forward relay 72 is energized. The first pole 73 in the closed position of the carrier forward relay bypasses the carrier forward positioning switch and locks the carrier forward relay closed until tripped by the third pole of the carrier return relay 101 described below. The second pole 74 of the carrier forward relay opens the potential supply to the ram raise switch 109 and simultaneously energizes the clamp cylinder solenoid 76, which solenoid actuates the clamp cylinder valve 77 causing the flow of air pressure to the clamp cylinder which closes the clamp cylinder. The third pole 75 of the carrier forward relay opens the potential supply to the first pole of the carrier return relay 99.

Pressure in the clamp cylinders 57 causes the clamps to close. When the clamp cylinders reach the end of their stroke, a needle clamping positioning switch 78 actuated by one of the clamps is closed, which energizes the needle clamping relay 79. The first pole 80 of the needle clamping relay bypasses the needle clamp positioning switch 78 and locks the needle clamping relay closed, until tripped by the third pole of the clamp release relay 106. The second pole 81 of the needle clamping relay opens the potential supply to the carrier forward positioning switch 71, and simultaneously energizes the ram lowering cylinder solenoid 83, which solenoid actuates the ram lowering cylinder valve 84 causing the flow of air pressure to the ram lowering cylinder which lowers the ram, shoving the needle cannulae downward against the pedestal electrodes. The stroke of the ram is greater than the distance through which any cannula may move so that after a cannula is firmly seated, it slides in the clamp jaw for the remainder of the ram's stroke. The third pole 82 of the needle clamping relay opens the potential supply to the first pole of the clamp release relay 104.

When the ram reaches its lower position, it actuates the ram lowering switch 85. As the ram lowering switch 85 is closed, the ram lowering relay 86 is energized. The first pole 87 of the ram lowering relay in the closed position bypasses the ram lowering switch 85 and locks the ram lowering relay closed until tripped by the third pole of the ram raising relay 113. The second pole 88 of the ram lowering relay opens the potential supply to the needle clamping positioning switch 78 and simultaneously energizes the timer 70 which includes a power supply relay 90 which controls the current to the cannula. The third pole 89 of the ram lowering relay opens the potential supply to the first pole of the ram raising relay 110.

After the desired interval of current flow, plus an additional interval for the cooling of the cannulae, the timer energizes the heating relay 91. The first pole 92 of the heating relay in the closed position locks the heating relay closed until tripped by the third pole of the ram raising relay 113. The second pole 93 of the heating relay opens the potential supply to the ram lowering switch 85 and simultaneously energizes the current supply to the carrier return cylinder solenoid 95, which solenoid actuates the carrier return cylinder valve 96 causing the flow of air to the carrier return end of the carrier cylinder 67 which causes the indexing slide to return to pick up the next pallet. The time required for this operation gives an additional cooling time.

When the indexing slide 64 reaches its return position, it actuates the carrier return switch 97 which energizes the carrier return relay 98. The first pole 99 of the carrier return relay in the closed position bypasses the carrier return switch and locks the carrier return relay closed until tripped by the third pole of the carrier forward relay 75. The second pole of the carrier return relay 100 is not used. The third pole 101 of the carrier return relay opens the potential supply to the first pole of the carrier forward relay 73, which relay 76 has been locked closed. The clamp cylinder solenoid 76 is de-energized closing the clamp cylinder valve 78 so that air is no longer supplied to the clamp cylinder, and the air in the clamp cylinder is permitted to escape. The clamp cylinders are spring retracted so that the clamps open under the influence of the springs in the cylinders.

As the clamps reach the open position, one of them actuates the clamp release switch 102 energizing the clamp release relay 103. The first pole 104 of the clamp release relay bypasses the clamp release switch 102 and locks the clamp release relay closed until tripped by the opening of the third pole 82 of the needle clamping relay. The second pole 105 of the clamp release relay opens the potential supply to the carrier return switch and simultaneously closes the potential supply to the ram raise cylinder solenoid 107. This solenoid actuates the ram raise cylinder valve 108, which supplies air to raise the ram. The third pole 106 of the clamp release relay opens the current supply to the first pole 80 of the needle clamping relay, thus releasing this relay, which releases the ram lowering cylinder solenoid 83 and opens the air supply through the ram lowering cylinder valve 84, thus the air pressure is removed from the lowering side and applied to the raising side of the piston in the ram cylinder 47.

As the ram reaches its top position, it closes the ram raise switch 109 which energizes the ram raise relay 110. The first pole 111 of the ram raise relay in the closed position bypasses the ram raise switch 109 and locks the ram raise relay closed until tripped by the opening of the third pole of the ram lowering relay 89. The second pole 112 of the ram raise relay opens the potential supply to the clamp release switch 103 and simultaneously energizes the carrier forward solenoid 114, which solenoid actuates the carrier forward cylinder valve 115 causing the flow of air to the carrier cylinder 67 and moving the carrier forward with the new pallet in position. The pallet containing the completed needles is pushed forward to a discharge position. The third pole 113 of the ram raise relay opens the potential supply to the first pole 87 of the ram lowering relay 86 and the first pole 92 of the heating relay thus opening these relays.

The cycle is then repeated.

The pallet in the discharge position 116 may be unloaded, or the needles may be tested by connecting an air manifold underneath the pallet to supply a metered air blast through a test orifice 118 to each pedestal electrode. A wind ribbon 117 above each hypodermic needle flutters in the air flowing through the needle, showing that the cannula is open. As an additional safety factor, if a cannula is obstructed, sufficient pressure can build up to blow the needle off the pedestal. If the cannula is open, test orifice 118 and gas orifice 27 reduce the air flow so that pressure is not built up and the needle remains on the pedestal.

After this check, the needles are removed by hand for packing, or the complete pallet is positioned above a package which is spaced with blisters to receive the needles from each pedestal. Such a method is convenient as all ten needles may be drawn off by a comb and dropped into blisters in a blister pack at a single operation, the pallet being returned for loading and the blister pack being processed by sealing a cover thereon, and sterilizing the needles.

As is obvious to those skilled in the art, variations from the above disclosure are a part of the present invention which is defined in the following claims.

I claim:
1. In the manufacture of hypodermic needles, a method of attaching a plastic hub to a metal cannula comprising: forming a plastic hub having a hole for the cannula slightly larger than the cannula, placing the hub on a pedestal electrode, inserting the metal cannula in the hub, pressing the cannula against the pedestal electrode, applying a second electrode to the cannula passing an electric current between the electrodes to heat the cannula hot enough to soften the adjacent portion of the hub sufficiently to flow against and adhere to the cannula, discontinuing the passage of said current, cooling the hub and cannula sufficiently that the hub is firm, passing a blast of gas through the cannula to insure that the cannula is open, and removing the assembled hypodermic needle from the pedestal electrode.

2. In the manufacture of hypodermic needles, a method of attaching a plastic hub to a metal cannula comprising: forming a plastic hub having a hole for the cannula slightly larger than the cannula, placing the hub on a pedestal electrode, inserting the metal cannula in the hub, pressing the cannula against the pedestal electrode, applying a second electrode to the cannula passing an electric current between the electrodes sufficient to heat the cannula hot enough to soften the adjacent portion of the hub sufficiently to flow against and adhere to the cannula, discontinuing the passage of said current, cooling the hub and cannula sufficiently that the hub is firm, and removing the assembled hypodermic needle from the pedestal electrode.

3. A process for the manufacture of plastic hubbed hypodermic needles comprising: forming plastic hubs having holes for cannulae slightly larger than the cannulae, placing the hubs on pedestal electrodes on a pallet, inserting the cannulae in the hubs, clamping the cannulae against the pedestal electrodes, applying second electrodes to the cannulae connecting the cannulae in series, passing an electric current between the pedestal and second electrodes to heat the cannulae and the plastic of the hub adjacent thereto until the plastic of the hub flows into contact with the cannulae, cooling the thus formed hypodermic needles until the plastic of the hub has hardened, releasing said needles, moving the pallet to a discharge position, and removing the needles from the pallet.

References Cited

UNITED STATES PATENTS

| | | | |
|---|---|---|---|
| 2,938,238 | 5/1960 | Gewecke et al. | 264—230 |
| 3,005,741 | 10/1961 | Hallas | 264—27 |

RICHARD M. WOOD, *Primary Examiner.*

J. GREGORY SMITH, *Assistant Examiner.*

U.S. Cl. X.R.

219—50; 264—27, 230